(12) United States Patent
Gibbon et al.

(10) Patent No.: US 8,088,226 B2
(45) Date of Patent: Jan. 3, 2012

(54) METHOD AND APPARATUS FOR TRANSPORTING A PRODUCT WITHIN A DIFFUSER

(75) Inventors: Michael John Gibbon, Durban (ZA); William Howard Yeo, Durban (ZA)

(73) Assignee: Bosch Projects (Pty) Ltd, Durban (ZA)

( * ) Notice: Subject to any disclaimer, the term of this patent is extended or adjusted under 35 U.S.C. 154(b) by 723 days.

(21) Appl. No.: 11/887,092

(22) PCT Filed: Mar. 23, 2006

(86) PCT No.: PCT/IB2006/000654
§ 371 (c)(1),
(2), (4) Date: Nov. 10, 2008

(87) PCT Pub. No.: WO2007/015124
PCT Pub. Date: Feb. 8, 2007

(65) Prior Publication Data
US 2009/0145726 A1 Jun. 11, 2009

(30) Foreign Application Priority Data

Mar. 24, 2005 (ZA) .................................. 2005/02447

(51) Int. Cl.
*B01D 11/02* (2006.01)
*B65G 25/02* (2006.01)

(52) U.S. Cl. ..................... 127/43; 127/3; 127/5; 99/275; 134/104.4; 198/495; 198/750.1

(58) Field of Classification Search ..................... 99/275; 127/3, 5, 43; 134/104.4; 198/495, 750.1
See application file for complete search history.

(56) References Cited

U.S. PATENT DOCUMENTS

| | | |
|---|---|---|
| 2,973,856 A | 3/1961 | Brooks |
| 3,731,613 A | 5/1973 | Wolff et al. |
| 4,037,714 A | 7/1977 | Koepke |
| 4,144,963 A | 3/1979 | Hallstrom |
| 4,691,819 A | 9/1987 | Hallstrom, Jr. |
| 4,727,978 A | 3/1988 | Hallstrom, Jr. |
| 5,310,044 A | 5/1994 | Quaeck |
| 5,340,264 A | 8/1994 | Quaeck |
| 5,383,548 A | 1/1995 | Quaeck |
| 5,415,271 A | 5/1995 | Foster |
| RE35,022 E | 8/1995 | Foster |
| 5,638,943 A | 6/1997 | Foster |

(Continued)

FOREIGN PATENT DOCUMENTS

CA 2172117 5/1996

(Continued)

*Primary Examiner* — David A Reifsnyder
(74) *Attorney, Agent, or Firm* — Nelson Mullins Riley & Scarborough LLP; Anthony A. Laurentano (57) ABSTRACT

A method and apparatus for transporting a product within a diffuser during a continuous lixiviation process. The apparatus comprises at least one screen deck for the continuous lixiviation process and at least one longitudinal transport zone, the longitudinal transport zone extending between an inlet and outlet of the diffuser. The transport zone may include a plurality of transport zones. A drive means is arranged to move the longitudinal transport zone at a first speed towards the outlet end of the diffuser and to retract the longitudinal transport zone at a second speed which is substantially faster than the first speed towards the inlet end of the diffuser, so that the transport zone drive the product towards the outlet of the diffuser.

32 Claims, 11 Drawing Sheets

U.S. PATENT DOCUMENTS

| | | |
|---|---|---|
| 5,806,660 A | 9/1998 | Foster |
| 5,934,445 A | 8/1999 | Foster et al. |
| 6,006,896 A | 12/1999 | Foster |
| RE37,121 E | 4/2001 | Gist |
| 6,257,396 B1 | 7/2001 | Quaeck |
| 6,457,578 B1 | 10/2002 | Bouchard et al. |
| 6,513,648 B1 | 2/2003 | Hallstrom et al. |
| 6,585,106 B1 | 7/2003 | Foster |
| 6,651,806 B2 | 11/2003 | Hallstrom |
| 6,758,324 B2 | 7/2004 | Joutsjoki et al. |
| 6,763,933 B1 | 7/2004 | Wilkens et al. |
| 6,848,569 B1 | 2/2005 | Foster |
| 2003/0168318 A1 | 9/2003 | Verhaeghe |
| 2004/0211648 A1 | 10/2004 | Verhaeghe |

FOREIGN PATENT DOCUMENTS

| | | |
|---|---|---|
| CA | 2182076 | 9/2001 |
| CA | 2307411 A1 | 11/2001 |
| CA | 2468598 A1 | 11/2004 |
| EP | 0508545 A1 | 10/1992 |
| EP | 0629550 A2 | 12/1994 |
| EP | 0657372 A2 | 6/1995 |
| EP | 0703165 A1 | 3/1996 |
| EP | 0709312 A2 | 5/1996 |
| EP | 0727369 A1 | 8/1996 |
| EP | 0776838 A2 | 6/1997 |
| EP | 0887290 A1 | 12/1998 |
| EP | 0 957 050 A1 | 11/1999 |
| EP | 0 959 027 A1 | 11/1999 |
| EP | 1038807 A2 | 9/2000 |
| EP | 1084966 A2 | 3/2001 |
| EP | 1266847 A1 | 12/2002 |
| EP | 1428775 A1 | 6/2004 |
| EP | 1428776 A1 | 6/2004 |
| EP | 1481925 A1 | 12/2004 |
| EP | 1505011 A1 | 2/2005 |
| GB | 1 262 917 A | 2/1972 |
| GB | 2096086 | 10/1982 |
| GB | 2097743 | 11/1982 |
| GB | 2157251 | 10/1985 |
| GB | 2320923 | 7/1998 |
| GB | 2375092 | 11/2002 |
| JP | 2003174844 | 6/2003 |
| WO | WO-97/24533 | 7/1997 |
| WO | WO-97/37914 A1 | 10/1997 |

LONGITUDINAL DRIVING MEMBER 62

METHOD AND APPARATUS FOR TRANSPORTING A PRODUCT WITHIN A DIFFUSER

RELATED APPLICATIONS

This application is a 35 U.S.C. 371 national stage filing of International Application No. PCT/IB2006/000654, filed 23 Mar. 2006, which claims priority to South Africa Patent Application No. 2005/02447 filed on 24 Mar. 2005 in South Africa. The contents of the aforementioned applications are hereby incorporated by reference.

BACKGROUND OF THE INVENTION

THIS invention relates to a method and apparatus for transporting a product within a diffuser of the kind used in continuous lixiviation processes, with the method and apparatus having particular application in the sugar industry.

The initial stage of sugar manufacture from sugar cane or sugar beet involves the extraction of sucrose-containing juice from the solid fibrous plant residue. In commercial plants, the first step in this process is the comminution of the plant material into small fragments, by processes such as knifing, slicing and/or shredding. The sucrose-containing juice is then extracted from the finely divided plant material by one or both of two processes:

Lixiviation, wherein the juice is washed and diffused out of the solid vegetable residue using additional liquid (water); or Crushing or pressing, wherein the juice is expressed out of the solid residue by mechanical squeezing.

In the sugar industry, the most widely used pure lixiviation process is that commonly referred to as "diffusion". In commercial equipment for this process, a bed of the finely divided plant material (typically 1200 to 1800 mm deep) is supported on an elevated perforated screen deck (floor) and moved along from an inlet to a discharge end of the diffuser at a rate of about 1 meter/minute. The bed is contained within a long steel trough of rectangular cross section, usually about 50 to 60 m long (to achieve 50 to 60 minutes retention) and between 5 and 12 m wide (depending on the required throughput capacity), with sides extending upwards to a height of 3 to 5 m. This trough is covered with a light roof.

The bottom of the trough is formed by a (fixed or moving) perforated screen deck, typically having a 20 to 45% open area. The open area may be formed by holes of 10 to 12 mm diameter at a 20 to 25 mm triangular pitch. The bed is transported forward along this deck. As the bed of material progresses along the diffuser, it is subject to lixiviation by flows of liquid percolating through the bed. Typically, the bed passes under sprays of water (at the discharge end of the diffuser) and dilute juice, which percolates through the bed collecting sucrose and down through the perforations in the deck. The liquid flows are applied in a generally counter-current direction to the solid material, with water or low concentration ("low brix") juice applied at the discharge end of the diffuser and concentrated ("high brix") juice removed from the inlet end of the diffuser. The juice is then collected in juice trays suspended beneath the screen deck. From these trays, it is pumped forward to further sprays until, at the front of the diffuser, the most concentrated juice is drawn off for further processing.

In existing commercial linear diffusers, the bed of material is transported forward by one of two means. In fixed screen deck diffusers, the bed is dragged forward by slats suspended between a series of chains, driven by sprockets mounted on a single long and costly rotating headshaft. Once the chains pass over the headshaft, they continue under the juice trays back to the feed end of the diffuser.

In moving screen deck diffusers, the bed rides forward on a moving perforated deck. The deck is made in a number of panels the width of the diffuser trough, carried on two large chains at either side of the diffuser. These chains are driven by two large sprockets on a headshaft. The headshaft is rotated either by a rotary drive or by reciprocating hydraulic cylinders that ratchet the chains forward in a discontinuous motion. Once the deck panels pass over the headshaft, they continue under the juice trays back to the feed end of the diffuser.

In both methods, the moving components need to extend across the full width of the diffuser. Both configurations require that, after passing along the diffuser, the bed-transporting components (chain-and-slats or deck panels) need to be returned to the inlet end of the diffuser. Practical disadvantages of these methods are that less than 50% of the costly chain-slat assembly or screen deck is usefully working at any time. Also, to permit the return of the moving components, a clear passage needs to be provided beneath the diffuser. This requires that the deck and body of the diffuser be supported on strong bridge sections across the width of the diffuser. The size and cost of the bridge structures escalates rapidly with the width to be spanned. This limits the maximum throughput capacity of diffusers that can be economically constructed. Moving components of both systems are highly stressed and costly to maintain.

It is an object of the invention to provide an alternative method of transporting a product within a diffuser during a continuous lixiviation process and an alternative transport apparatus.

SUMMARY OF THE INVENTION

According to the invention there is provided a method of transporting a product within a diffuser having a screen deck during a continuous lixiviation process, the method comprising:

providing a screen deck for the continuous lixiviation process;

providing at least one longitudinal transport zone, the longitudinal transport zone extending between an inlet and outlet of the diffuser;

moving the transport zone towards the outlet of the diffuser at a first speed to cause the transport zone to drive the product towards the outlet; and retracting the transport zone towards the inlet of the diffuser at a second speed substantially faster than the first speed while the product continues to move towards the outlet of the diffuser, to return the transport zone to its original position.

Preferably, the method includes providing a plurality of longitudinal transport zones;

moving a majority of the plurality of transport zones towards the outlet of the diffuser at the first speed to cause the transport zones to drive the product towards the outlet; and selectively retracting a minority of the plurality of transport zones towards the inlet of the diffuser at a second speed substantially faster than the first speed while the product continues to move towards the outlet of the diffuser, to return the minority of transport zones to their original positions.

Preferably the step of moving a majority of the plurality of transport zones toward the outlet of the diffuser includes moving the majority simultaneously towards the outlet.

The method may include commencing movement of the transport zones towards the outlet at different times, a transport zone reaching the end of its travel towards the outlet then being retracted towards the inlet while other transport zones continue to move towards the outlet.

Typically the step of retracting a minority of the plurality of transport zones towards the inlet of the diffuser includes moving one of the plurality of transport zones towards the inlet of the diffuser.

The second speed of the plurality of transport zones may be three or more times faster than the first speed of the plurality of transport zones. Preferably the second speed of the plurality of transport zones may be six to fifteen times faster than the first speed of the plurality of transport zones.

The first speed of the plurality of transport zones is preferably about one meter/minute.

The transport zone may include a plurality of transversally extending transport members.

Further according to the invention there is provided an apparatus for transporting a product within a diffuser during a continuous lixiviation process, the apparatus comprising:

at least one screen deck for the continuous lixiviation process;

at least one longitudinal transport zone, the longitudinal transport zone extending between an inlet and outlet of the diffuser; and drive means arranged to move the longitudinal transport zone at a first speed towards the outlet end of the diffuser and to retract the longitudinal transport zone at a second speed which is substantially faster than the first speed towards the inlet end of the diffuser, so that the transport zone drive the product towards the outlet of the diffuser.

Preferably the at least one longitudinal zone is a plurality of longitudinal transport zones, and the drive means are arranged to move a majority of the longitudinal transport zones at a first speed towards the outlet end of the diffuser and selectively to retract a minority of the longitudinal transport zones at a second speed which is substantially faster than the first speed towards the inlet end of the diffuser, so that the transport zones drive the product towards the outlet of the diffuser.

The drive means may comprise a plurality of first drive means, each first drive means being attached to an outlet end of a respective longitudinal transport zone, and being arranged to move the respective longitudinal transport zone at a first speed towards the outlet end of the diffuser, and a plurality of second drive means, each second drive means being attached to an inlet end of a respective longitudinal transport zone and being arranged to retract the respective longitudinal transport zone at a second speed which is substantially faster than the first speed towards the inlet end of the diffuser.

Each longitudinal transport zone may alternatively comprise a longitudinal section of moving perforated screen deck.

Typically, the perforated screen deck defines the longitudinal transport zones.

The sections of moving perforated screen deck may be supported on longitudinal skid rails.

Alternatively, the sections of moving perforated screen deck may be supported on rotating rollers.

Alternatively, the sections of moving perforated screen deck may be supported on articulated supporting columns.

The zone may include a plurality of transversely extending transport members to drive the product towards the outlet of the diffuser.

Optionally, the transversely extending transport members may be mounted on an upper surface of the sections of moving perforated screen deck.

Preferably each longitudinal transport zone includes at least one longitudinal driving member.

In an alternative embodiment of the invention, each longitudinal transport zone comprises a fixed screen deck with the transport members attached above the fixed screen deck to the least one longitudinal driving member.

Each longitudinal driving member may be an elongate bar.

Opposed ends of each transport member may be attached to adjacent longitudinal driving members, thereby forming a ladder structure.

Alternatively, each transport member may be attached centrally to a longitudinal driving member, thereby forming a tree structure.

Alternatively, each transport member may be hinged to the longitudinal driving member, so that when the respective longitudinal transport zone moves towards the outlet of the diffuser each transport member extends transversely away from the longitudinal driving member, but folds inwardly against the longitudinal driving member when the respective longitudinal transport zone retracts towards the inlet of the diffuser.

Typically the plurality of transport members is regularly spaced along the length of the longitudinal transport zones and/or driving members.

Preferably each transport member has a leading edge defining an upright face directed towards the outlet to push the product towards the outlet when the respective transport zone moves towards the outlet end of the diffuser.

Each transport member preferably has a trailing edge defining an inclined surface directed towards the inlet end of the diffuser to allow the transport member to slide relative to the product when the respective transport zone moves towards the inlet end of the diffuser.

Preferably the apparatus includes a control system arranged to control the first and second drive means so that a minority of the plurality of transport zones is moved towards the inlet of the diffuser, while the majority of the plurality of transport zones are moved towards the outlet.

The first and second drive means and/or the control system may be arranged so that the second speed of the plurality of transport zones is three or more times faster than the first speed of the plurality of transport zones. Preferably the first and second drive means and/or the control system may be arranged so that the second speed of the plurality of transport zones is six to fifteen times faster than the first speed of the plurality of transport zones.

The first speed of the plurality of transport zones is preferably about 1 meter/minute.

DESCRIPTION OF PREFERRED EMBODIMENTS

Figure 1A:
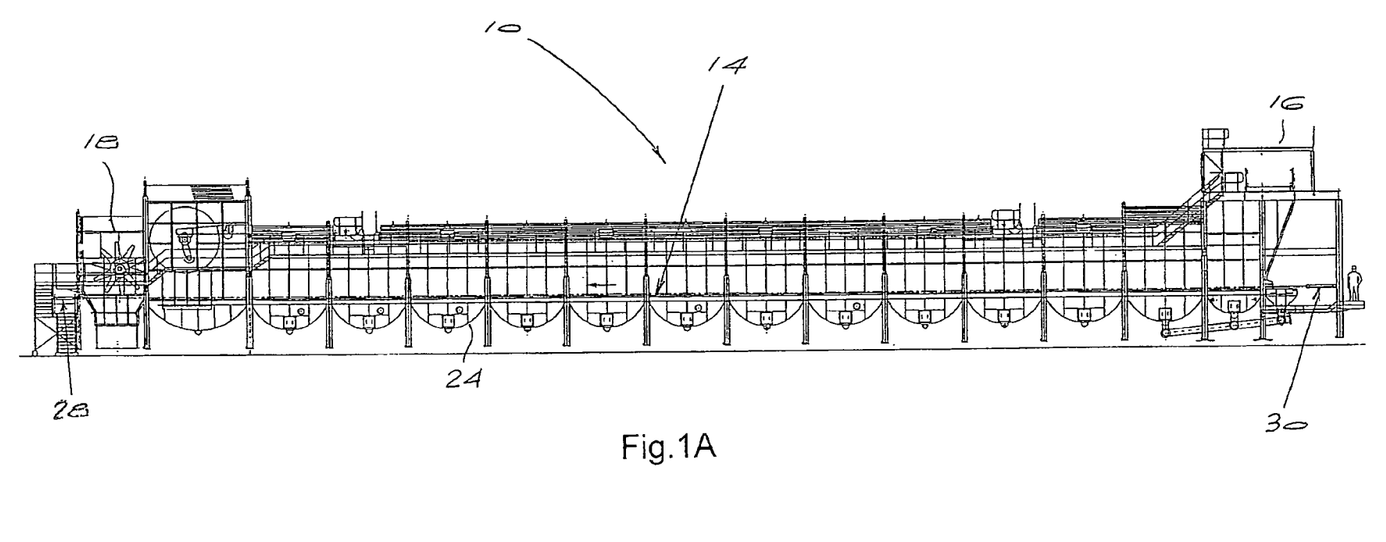
FIG. 1A is a side elevation of a diffuser incorporating transport apparatus according to the invention.
Figure 1B:
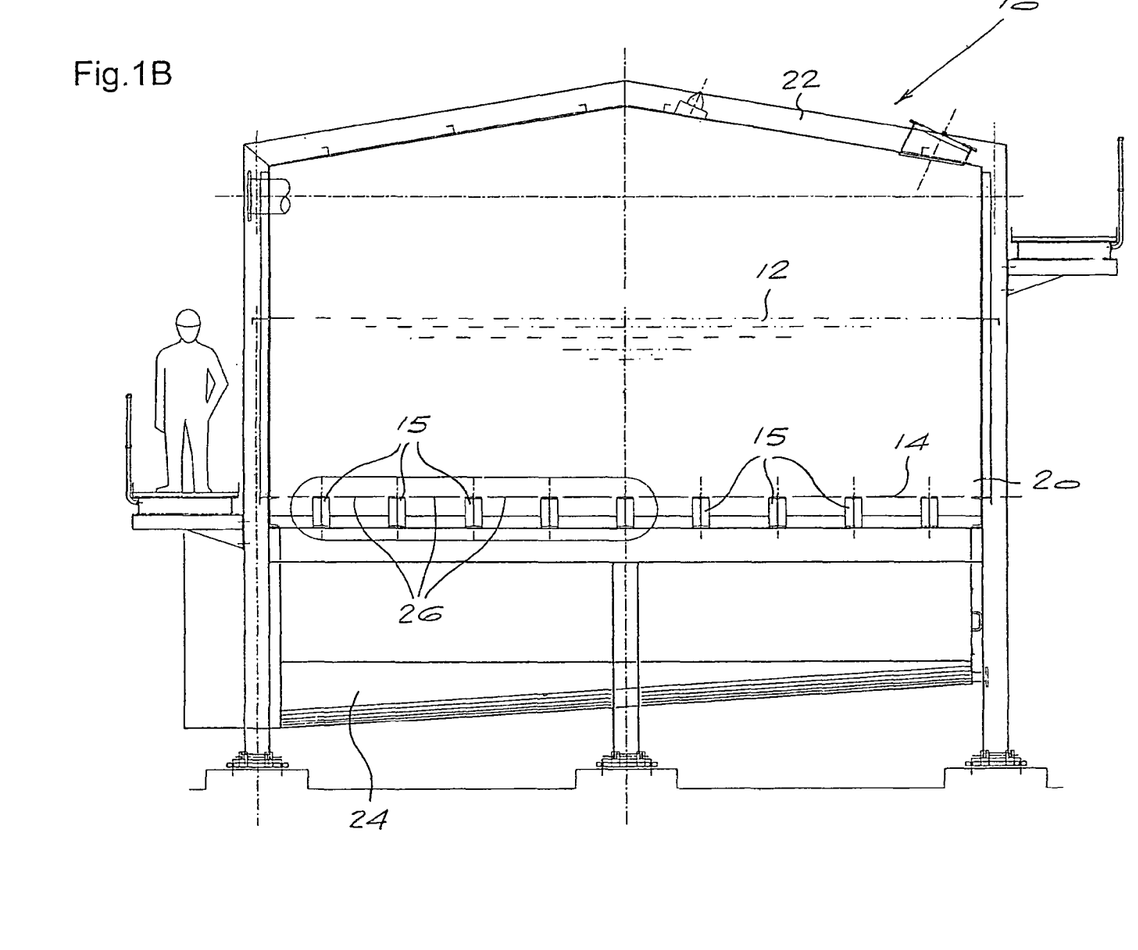
FIG. 1B is a sectional elevation of the diffuser of FIG. 1A.

A linear deck diffuser 10 for use in a continuous lixiviation process for the manufacture of sugar is shown in FIGS. 1A and 1B.

A bed of finely divided sugar-containing plant material 12, which is typically 1200 to 1800 mm deep, is supported on an elevated perforated screen deck or floor 14 supported on deck support beams 15. The bed is moved along from an inlet 16 of the diffuser 10 to an outlet or discharge end 18 of the diffuser 10. The bed is contained within a long steel trough 20 of rectangular cross section, usually about 50 to 60 m long and between 4 and 20 m wide (depending on throughput capacity), with sides extending upwards to a height of 3 to 5 m. This configuration achieves retention of the bed 12 in the diffuser for a period of between 50 to 60 minutes, assuming that the bed moves at a speed of about 1 meter/minute. The trough 20 is covered with a light roof 22.

As mentioned, the bottom of the trough 20 is formed by a fixed or moving perforated deck 14, with holes to provide an open area typically of 22% to 40% of the total screen deck surface. For example 10 to 12 mm diameter holes may be provided at a 20 to 25 mm triangular pitch. The bed 12 is transported forward, from the inlet 16 of the diffuser 10 to the outlet 18 of the diffuser, along the deck 14. As the bed of material progresses along the diffuser 10, it is subject to lixiviation as described in the background of the invention. The juice of the lixiviation process is collected in juice trays 24 suspended beneath the deck 14.

The transport apparatus according to the present invention comprises the screen deck 14, mentioned above, and a plurality of longitudinal transport zones, with each zone extending between the inlet 16 of the diffuser 10 and the outlet 18 of the diffuser. The longitudinal zones are typically 500 to 1200 mm in width. Different embodiments of the longitudinal transport zones 26 are described below.

Figure 2:
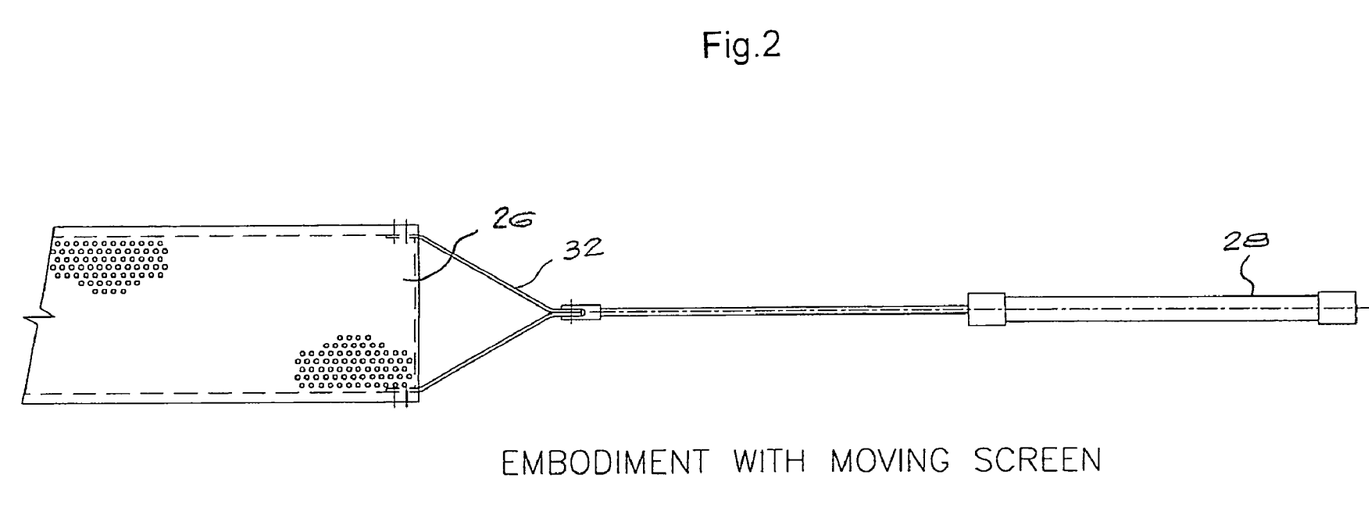
FIG. 2 is a plan view of an end of a longitudinal transport zone of the apparatus connected to a first drive means according to the invention.
Figure 3:
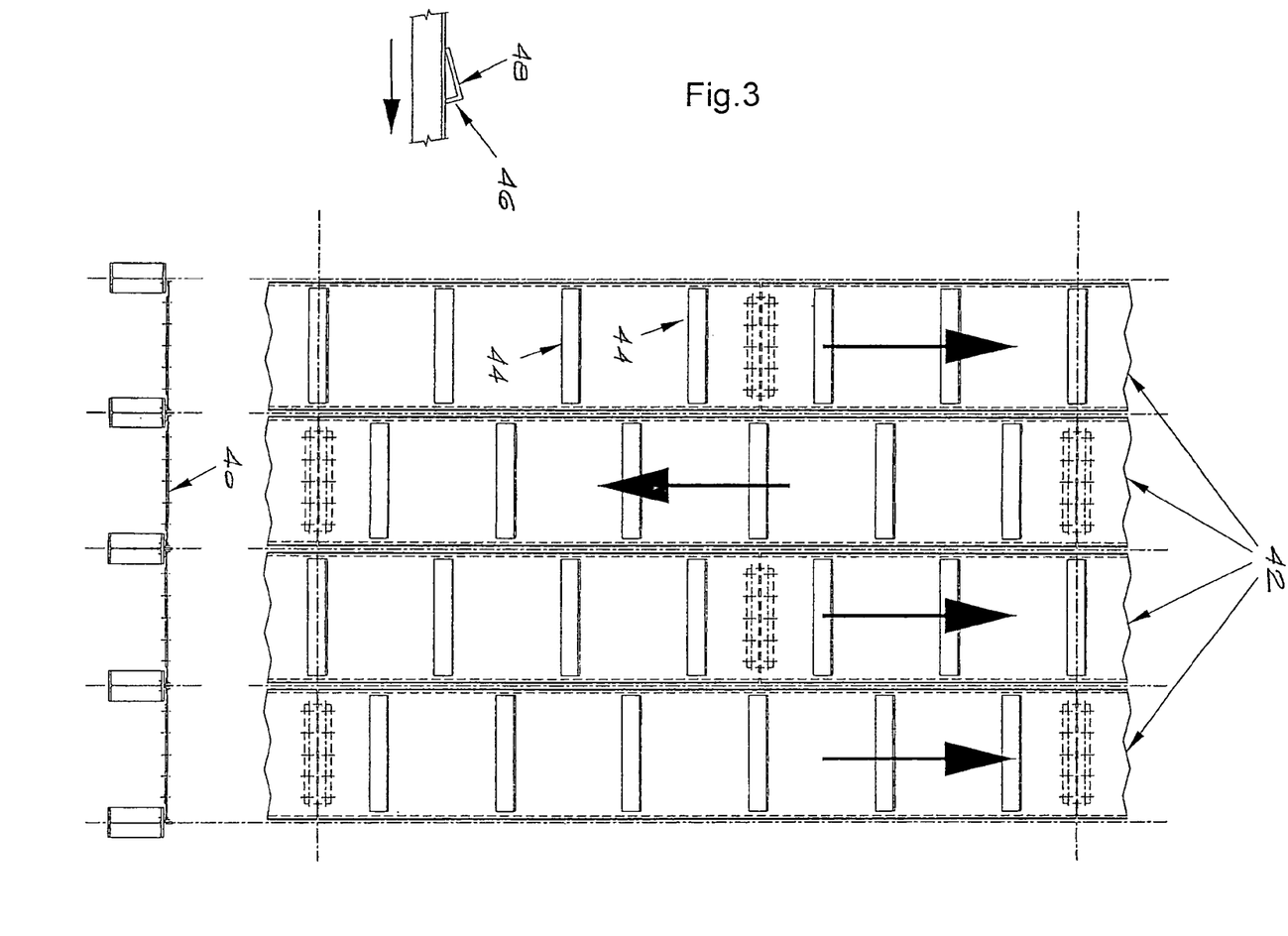
FIG. 3 is plan view of a first embodiment of the transport apparatus of the invention, wherein the transport apparatus forms part of a perforated screen deck.
Figure 4:
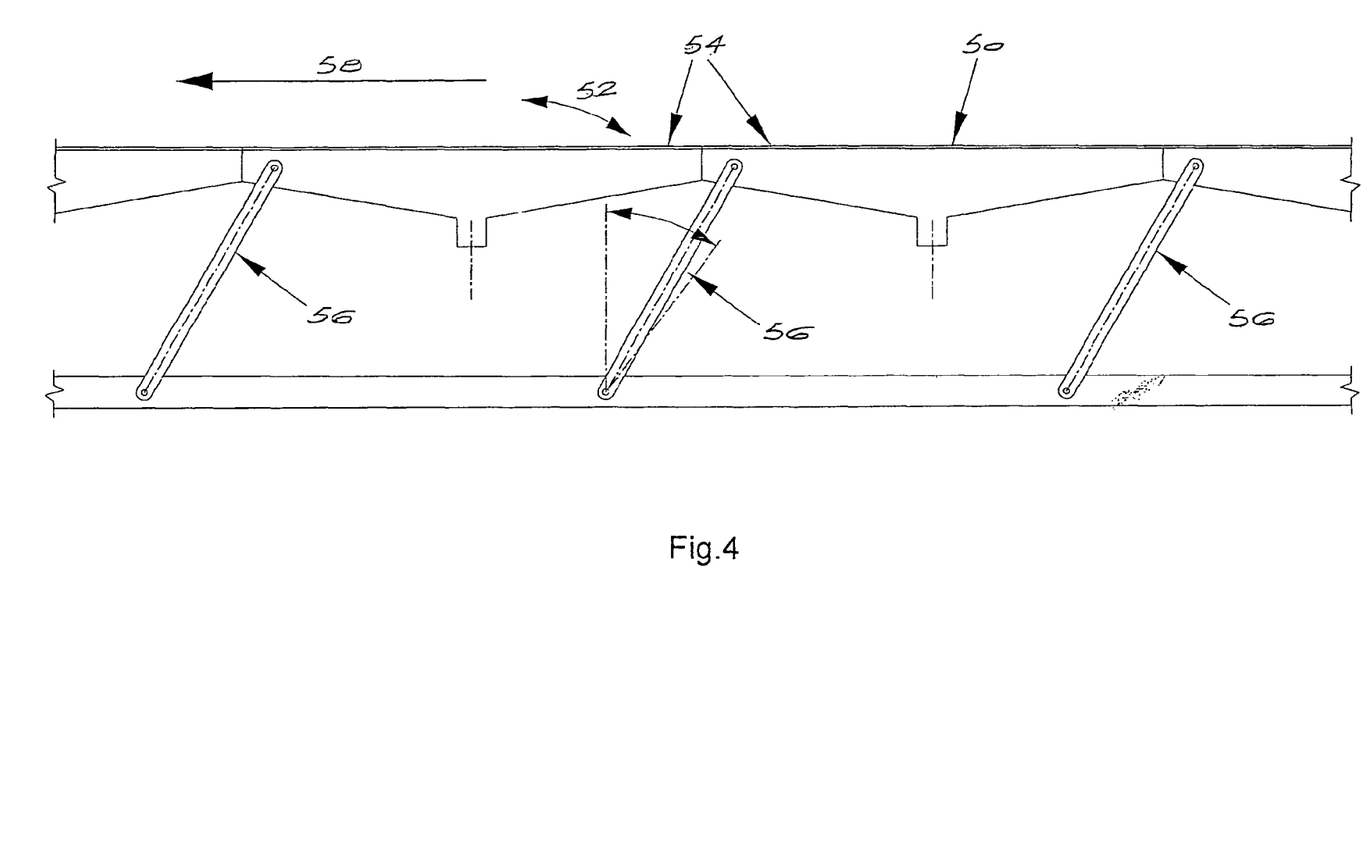
FIG. 4 is a schematic side elevation of a second embodiment of the transport apparatus of the invention, wherein the transport apparatus comprises part of an articulated screen deck.

In general, each longitudinal transport zone 26 and 42, shown in FIGS. 2 to 4, may include a plurality of transversely extending transport members 44 and 54 which may be mounted on a screen deck, as shown in FIGS. 3 and 4, to form a moving perforated screen deck 26, 40 and 50. Alternatively, a plurality of transversely extending transport members 74, 84, 94 and 104 may be attached to longitudinal driving members 70, 80, 90 and 100 as described in FIGS. 6 to 10. This configuration provides for fixed screen decks 79, 86, 96 and 106, and accordingly a fixed screen deck diffuser.

Referring, in general to FIGS. 1A, 1B and 2, attached to each outlet end of each respective longitudinal transport zone is a first drive means 28. Similarly, attached to each inlet end of each respective longitudinal transport zone is a second drive means 30. Typically, the first and second drive means 28 and 30 are hydraulic cylinders which move the respective longitudinal transport zones towards the outlet 18 and retract the respective longitudinal transport zones towards the inlet 16 of the diffuser 10.

As is best shown in FIG. 2, the first drive means or hydraulic cylinder 28 may be attached by a triangular bracket 32 to transport zone 26. It will be appreciated that alternative drive means could also be used instead of hydraulic cylinders and that any means of attachment may be used between the drive means and the transport zone.

The first drive means 28 moves the longitudinal transport zone to which it is secured towards the outlet of the diffuser at a first speed, while the second drive means 30 retracts the longitudinal transport zone towards the inlet of the diffuser at a second, higher speed.

The movement of the different zones is staggered, with the zones being sequenced to start at different times. Each zone's movement starts with a long, slow forward movement during which the bed is transported forward at approximately the same speed as the forward moving components. Typically, the duration of this forward movement may be for 60 or 120 seconds at a speed of about 1 meter/minute. This results in a movement forward by 1 or 2 meters, respectively. A majority of zones move toward the outlet, with a minority, and typically only one, zone retracting towards the inlet at any given time.

At the end of the forward movement, the second drive means 30 retracts the zones 26 rapidly to their starting position, which movement is towards the inlet 16 of the diffuser 10. The second speed at which the zones are retracted may be three or more times faster than the first speed which moves the zones towards the outlet. Preferably, the second speed at which the zones 26 are retracted is six to fifteen times faster than the first speed which moves the zones 26 towards the outlet. The retracting movement towards the inlet 16 has a correspondingly shorter duration than the forward movement towards the outlet 18.

The different speeds mentioned above are the average speeds at which the zones travel.

Because of the speed of retraction and the design of the transport apparatus, in particular the transport zones and their transport members (see below), and because the adjacent zones 26 are moving forward towards the outlet 18, the retracting zone and its components slide back beneath the bed without interfering substantially with the forward movement of the bed. The bed as a whole is accordingly moved forwards towards the outlet 18, irrespective of the periodic retraction of each of the zones. The overall forward movement of the total bed is induced by the fact that, at any one time, most of the zones are being propelled forward toward the outlet 18 and there is substantial friction or engagement between the bed of material and the forward-moving zones with their respective transport members, with less friction between the bed of material and the retracting zone or zones with the respective transport members.

On reaching the starting position, slow forward movement of the retracted zones is resumed.

In the first and second embodiments, shown in FIGS. 3 and 4, the perforated screen deck 40 and 50 itself reciprocates forward, towards the outlet 18 of the diffuser, and backward, towards the inlet 16 of the diffuser.

Turning in particular to FIG. 3, sections of perforated screens are joined together to form the plurality of complete transport zones 42. The transport zones 42, each typically 500 to 1200 mm in width, are carried on the deck support beams 15. The transport zones 42 either slide on supporting skid rails that run along both sides of each zone 42 or may run on small wheels that roll on longitudinal tracks. The transport zones 42 are alternately moved or pulled slowly forward towards the outlet 18 of the diffuser by the drive means 28 at a first speed, then rapidly retracted at a second, higher speed towards the inlet of the diffuser.

In this embodiment, transversely extending transport members in the form of low height transverse slats 44 may be attached or mounted onto the upper surface of the screen deck to assist in propelling the bed. These slats 44 can also be of a triangular cross-section that presents a substantially vertical upright face 46 to push the bed on the forward stroke, but an angled face 48 to slide under the bed on retracting.

Figure 5:
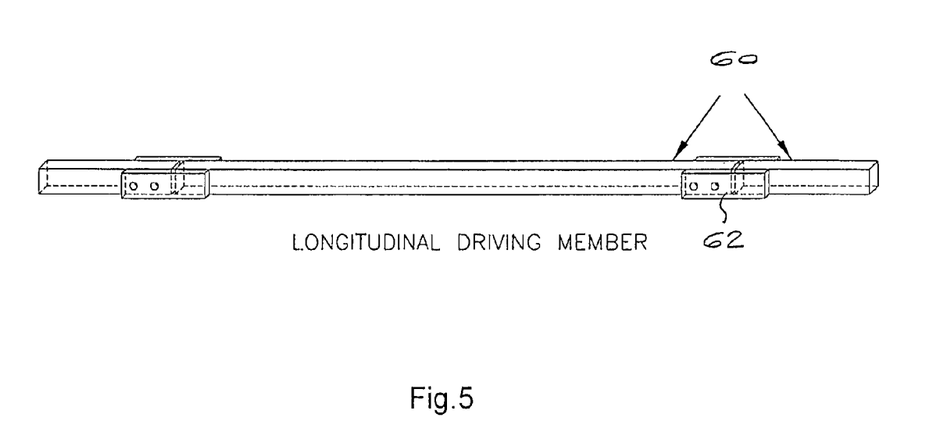
FIG. 5 is a perspective view of a longitudinal driving member according to an embodiment of the present invention.

FIG. 4 shows a second embodiment of the transport apparatus, as also applied to the moving deck type diffuser, comprising an arrangement wherein the movement of the deck 50 is articulated. FIG. 5 depicts part of one longitudinal transport zone. The portions of the deck making up each transport zone are raised slightly on the forward stroke and/or lowered on the return stroke, as shown by arrow 52. The transport zones comprise transport members in the form of deck sections 54 that are carried on sets of articulated supporting columns 56 that provide a rocking motion in which the screen zones are lifted on the forward stroke 58 and lowered on the return stroke.

In other embodiments of the invention, each longitudinal screen decked transport zone 26 which may include a plurality of transversely extending transport members, and which may further have the transversely extending transport members attached, above a fixed screen deck, to longitudinal driving members 70, 80, 90 or 100, as shown in FIGS. 6 to 9.

As shown in FIG. 5, the longitudinal driving members may comprise steel bars 60, with a rectangular cross-section of typically about 60 to 120 mm high by 40 to 70 mm wide. However, it will be appreciated that the dimensions of the steel bars 60 may vary according to the specific requirements of the apparatus. To extend the length of the longitudinal driving members to the preferred length of the diffuser of about 55 m, a number of bars 60 are joined together end-to-end with simple side splices 62. Other means of attachment may also be used to join the bars 62.

The third to seventh embodiments of the transport apparatus of the invention, illustrated in FIGS. 6 to 10, can be incorporated in a conventional fixed deck diffuser 10 as described above.

Figure 6:
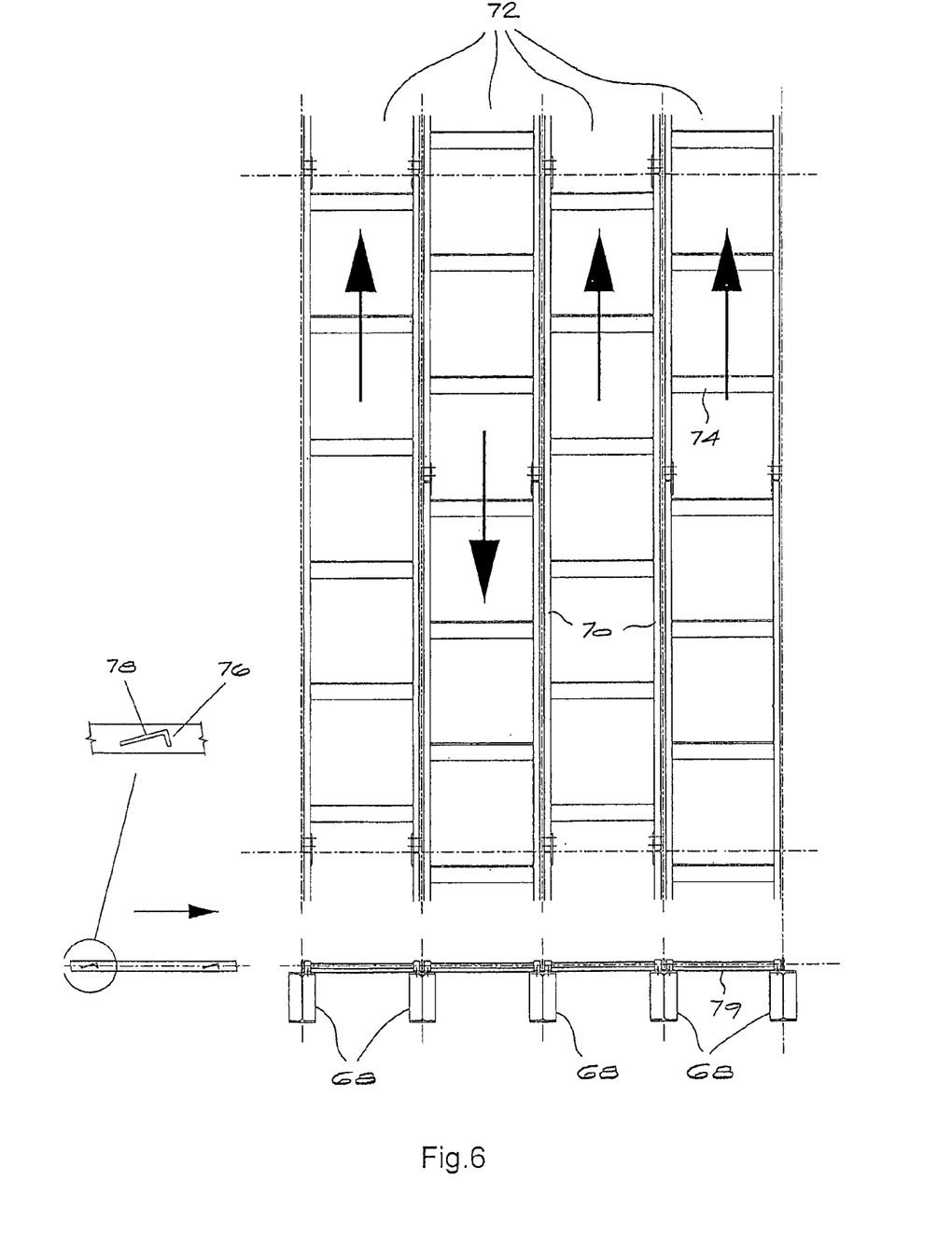
FIG. 6 is a plan view of a third embodiment of the transport apparatus of the invention, having a ladder structure.

Turning to FIG. 6, a third embodiment of the transport apparatus according to the invention is shown. This embodiment has a ladder structure with each end of the transversely extending transport members 74 being attached to adjacent longitudinal driving members 70. The bed in each zone 72 is carried between two adjacent longitudinal driving members 70, which are drawn forward towards the outlet and then retracted together towards the inlet.

As with many of the other embodiments of the transporting mechanism, the transport members 74 are typically slats or scrapers having a cross-section designed to present a leading edge which defines an upright face 76 directed towards the outlet of the diffuser, to engage and push the bed on the forward stroke toward the outlet. Each slat also has a trailing edge defining an inclined surface 78 directed towards the inlet of the diffuser. This configuration allows the slats to slide easily under the bed as they retract to their original positions beneath the bed and effectively provides a ratcheting effect, thereby enhancing the effectiveness of the apparatus.

The transport members 74 of the transport zones 72 are supported, above the screen deck 79, on deck support beams 68.

Figure 7:
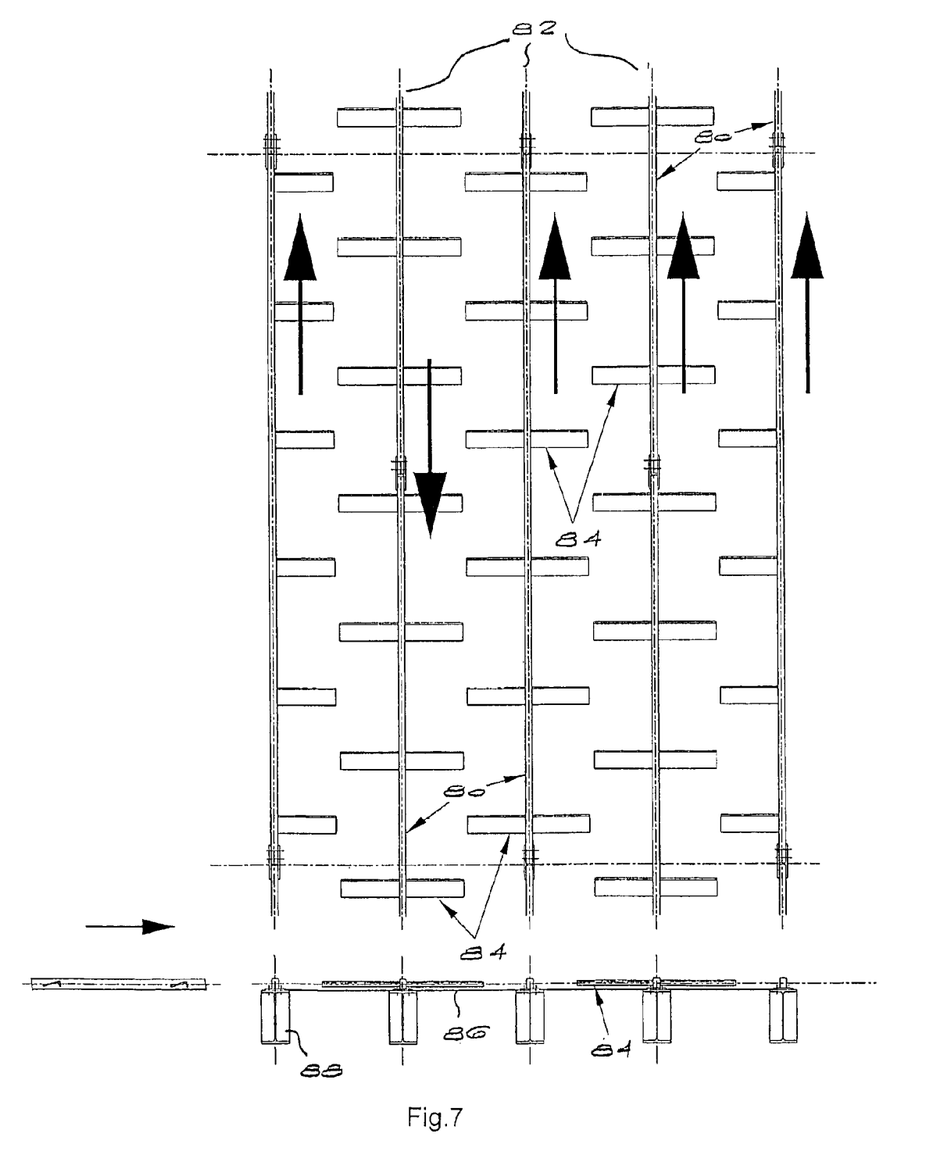
FIG. 7 is a plan view of a fourth embodiment of the transport apparatus of the invention, having a fixed tree structure.

FIG. 7 illustrates a fourth embodiment of a transport apparatus in accordance with the invention, the transport apparatus comprising different transport zones 82, having a tree structure with pairs of transport members 84 in the form of slats or scrapers being cantilevered off both sides of a single longitudinal driving member 80. As in the embodiment of FIG. 6, the cross-section of the slats is designed to present a vertical face to engage and push the bed on the forward stroke, but an angled face on retracting, so that the scrapers slide easily under the bed when retracting.

FIG. 7 also clearly shows the configuration of the transport members 84 being located above a fixed screen deck 86, with the fixed screed deck 86 supported on deck support beams 88.

Figure 8:
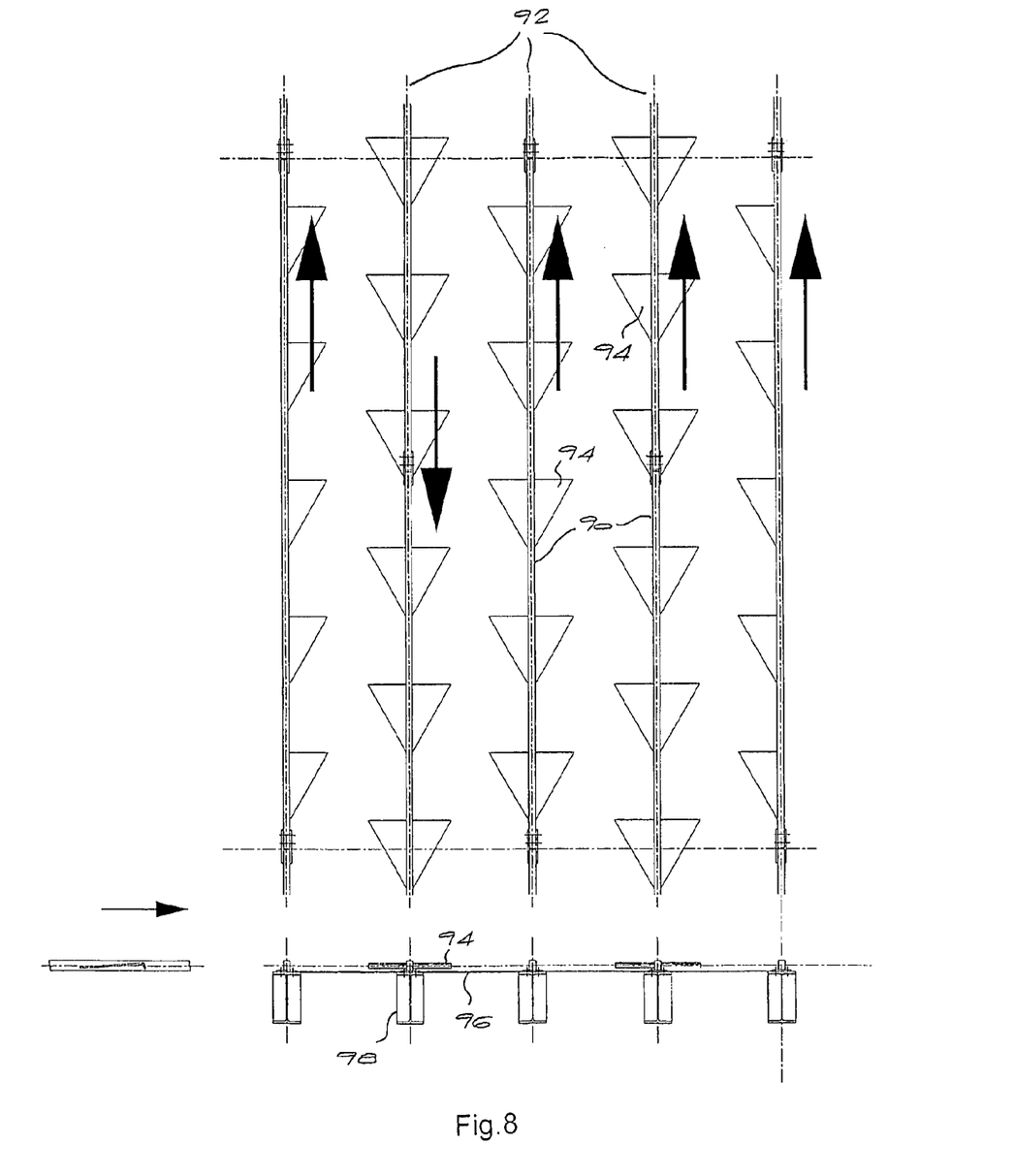
FIG. 8 is a plan view of a fifth embodiment of the transport apparatus of the invention, having a fixed tree structure similar to that of FIG. 7, but with the transport members being triangular in shape.

In FIG. 8, a fifth embodiment is shown, the fifth embodiment being a modified version of the fourth embodiment. In this embodiment the transport apparatus includes triangular transport members 94. The transport members 94 are designed to present a face normal to the direction of motion to engage and push the bed on the forward stroke, but an angled face on retracting so that the scrapers slide easily through the bed when retracting. The transport members 94 are secured to multiple single longitudinal driving members 90, to define the transport zones 92.

The transport members 94 are supported, with the fixed screen deck 96, on the deck support beams 98.

Figure 9:
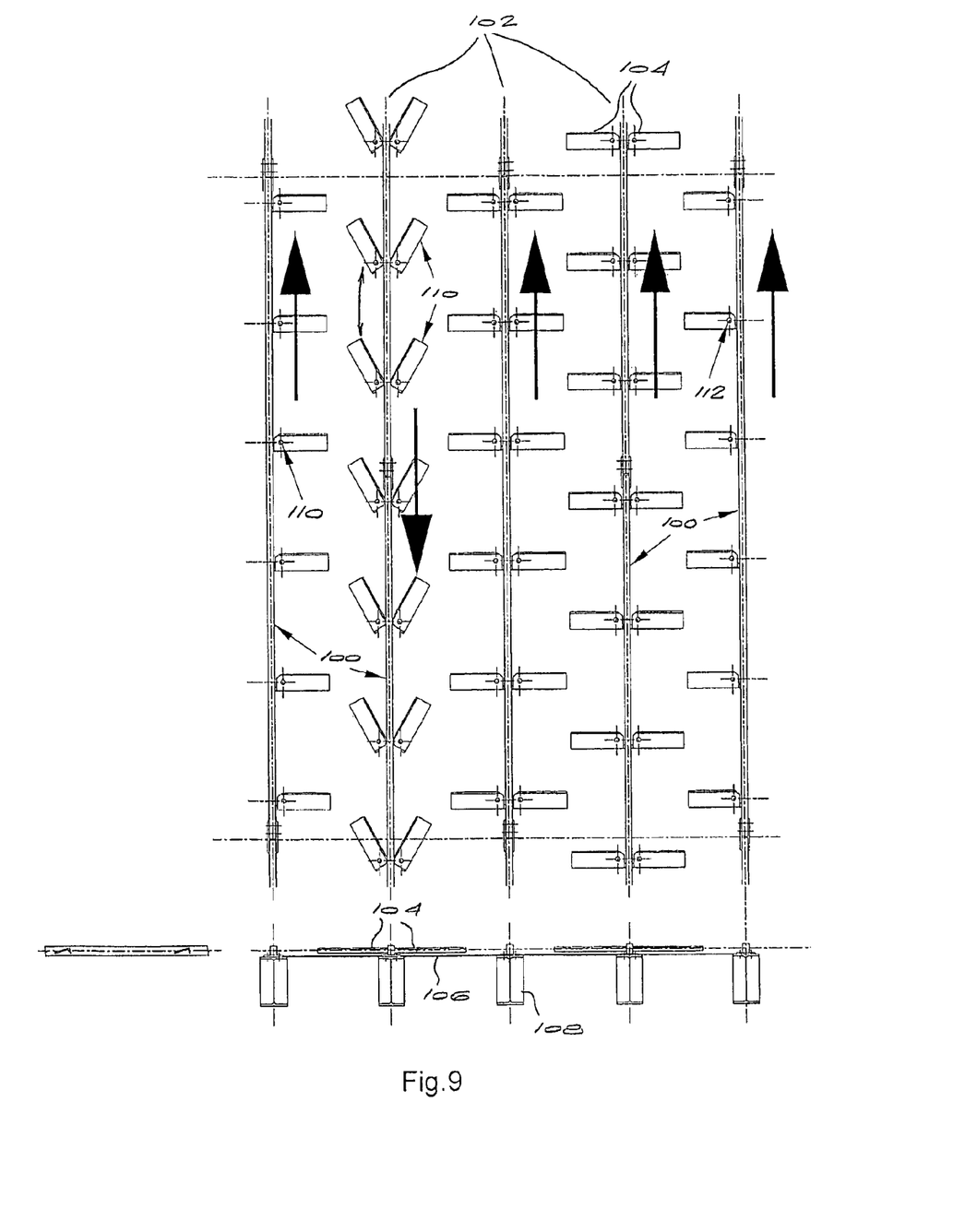
FIG. 9 is plan view of a sixth embodiment of the transport apparatus of the invention, having a folding tree structure.
Figure 10:
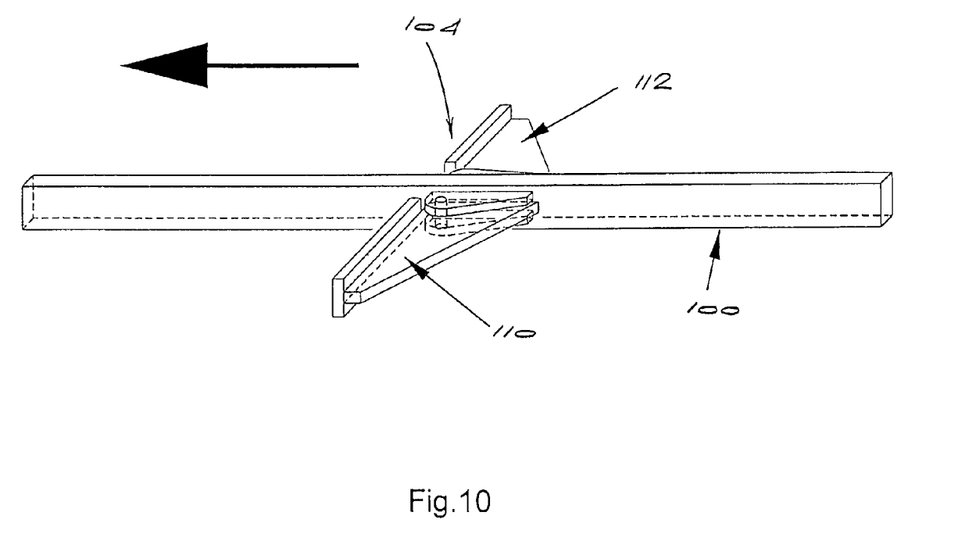
FIG. 10 is a perspective view of an enlargement of two hinged transport members in the embodiment of FIG. 9.

A sixth embodiment of the transport apparatus is shown in FIGS. 9 and 10, with each transport zone 102 comprising a transport member 104 including a pair of scrapers 110 and 112 which are hinged to either side of the longitudinal driving members 100. This configuration forms a collapsible tree structure in which the transport members or scrapers 104 are arranged so that on the forward stroke, the scrapers are cantilevered outwards perpendicular to and away from the longitudinal driving members. However, on the return stroke the scrapers fold back and collapse against the longitudinal driving members 100 thereby presenting a minimal contact area to the bed.

As with the other embodiments, the transport members 104 and fixed screen deck 106 rests on the deck support beams 108.

The apparatus according to any of the mentioned embodiments may include a control system which is arranged to control the first and second drive means so that one of the transport zones is moved towards the inlet of the diffuser, while the majority of the plurality of transport zones are moved towards the outlet. The control system may also control the respective speeds of the transport zones.

In the preferred embodiment of the control system, the movement of the zones is programmed using computer software. The computer software typically includes a displacement matrix using feedback loops from linear position transmitters on each zone. The movement of the zones is typically sequenced with the computer software such that, at any time, the minimum number of zones and preferably no two adjacent zones are retracting towards the inlet of the diffuser.

It will be appreciated that in certain embodiments of the invention, in particular in instances where the diffuser is small and narrow, only one or two longitudinal transport zones may be provided. A diffuser with one longitudinal transport zone will work on the same principle, with the one transport zone moving towards the outlet of the diffuser at a first speed causing the transport members to drive the product towards the outlet. The same transport zone moves towards the inlet of the diffuser at a second speed, which is faster than the first speed, returning the zone to its original position, while the product continues to move towards the outlet.

The present invention provides a transport apparatus allowing a diffuser structure and deck to be simply supported from the ground at a low level, without the need for costly structural steel and heavy bridge members. As the motion of the transporting mechanism is linear, no headshaft and drive chains are required as in the prior art. As this form of drive is a costly, high maintenance item in conventional diffusers, the present invention is more cost effective. The cost of construction of diffusers using the transporting mechanism according to the present invention is also lower. The drive system of the present invention is simple, and there is no practical limitation on the width and therefore on the capacity that can be handled by a single diffuser.

The invention claimed is:

1. A method of transporting a product within a diffuser having a screen deck during a continuous lixiviation process, the method comprising:
    providing a screen deck for the continuous lixiviation process;
    providing at least one longitudinal transport zone, the longitudinal transport zone extending between an inlet and outlet of the diffuser;
    moving the transport zone towards the outlet of the diffuser at a first speed to cause the transport zone to drive the product towards the outlet; and
    retracting the transport zone towards the inlet of the diffuser at a second speed substantially faster than the first speed while the product continues to move towards the outlet of the diffuser, to return the transport zone to its original position.

2. A method according to claim 1, wherein the method includes providing a plurality of longitudinal transport zones;
    moving a majority of the plurality of transport zones towards the outlet of the diffuser at the first speed to cause the transport zones to drive the product towards the outlet; and
    selectively retracting a minority of the plurality of transport zones towards the inlet of the diffuser at a second speed substantially faster than the first speed while the product continues to move towards the outlet of the diffuser, to return the minority of transport zones to their original positions.

3. A method according to claim 2, wherein the step of moving a majority of the plurality of transport zones toward the outlet of the diffuser includes moving the majority simultaneously towards the outlet.

4. A method according to claim 2, further comprising commencing movement of the transport zones towards the outlet at different times, a transport zone reaching the end of its travel towards the outlet then being retracted towards the inlet while other transport zones continue to move towards the outlet.

5. A method according to claim 2, wherein the step of retracting a minority of the plurality of transport zones towards the inlet of the diffuser includes moving one of the plurality of transport zones towards the inlet of the diffuser.

6. A method according to claim 2, wherein the second speed of the plurality of transport zones is three or more times faster than the first speed of the plurality of transport zones.

7. A method according to claim 6, wherein the second speed of the plurality of transport zones is six to fifteen times faster than the first speed of the plurality of transport zones.

8. A method according to claim 2, wherein the first speed of the plurality of transport zones is about one meter/minute.

9. A method according to claim 1, wherein the transport zone comprises a plurality of transversally extending transport members.

10. An apparatus for transporting a product within a diffuser during a continuous lixiviation process, the apparatus comprising:
    at least one screen deck for the continuous lixiviation process;
    at least one longitudinal transport zone, the longitudinal transport zone extending between an inlet and outlet of the diffuser; and
    drive means arranged to move the longitudinal transport zone at a first speed towards the outlet end of the diffuser and to retract the longitudinal transport zone at a second speed which is substantially faster than the first speed towards the inlet end of the diffuser, so that the transport zone drive the product towards the outlet of the diffuser.

11. An apparatus according to claim 10, wherein the at least one longitudinal zone comprises a plurality of longitudinal transport zones, and the drive means are arranged to move a majority of the longitudinal transport zones at a first speed towards the outlet end of the diffuser and selectively to retract a minority of the longitudinal transport zones at a second speed which is substantially faster than the first speed towards the inlet end of the diffuser, so that the transport zones drive the product towards the outlet of the diffuser.

12. An apparatus according to claim 11, wherein the apparatus includes a control system arranged to control the first and second drive means so that a minority of the plurality of transport zones is moved towards the inlet of the diffuser, while the majority of the plurality of transport zones are moved towards the outlet.

13. An apparatus according to claim 11, wherein the first speed of the plurality of transport zones is about 1 meter/minute.

14. An apparatus according to claim 10, wherein the drive means comprises a plurality of first drive means, each of said first drive means being attached to an outlet end of a respective longitudinal transport zone, and being arranged to move the respective longitudinal transport zone at a first speed towards the outlet end of the diffuser, and a plurality of second drive means, each second drive means being attached to an inlet end of a respective longitudinal transport zone and being arranged to retract the respective longitudinal transport zone at a second speed which is substantially faster than the first speed towards the inlet end of the diffuser.

15. An apparatus according to claim 14, wherein the first and second drive means and/or the control system are/is arranged so that the second speed of the plurality of transport zones is three or more times faster than the first speed of the plurality of transport zones.

16. An apparatus according to claim 15, wherein the first and second drive means and/or the control system are/is arranged so that the second speed of the plurality of transport zones is six to fifteen times faster than the first speed of the plurality of transport zones.

17. An apparatus according to claim 10, wherein the transport zone comprises a plurality of transversely extending transport members to drive the product towards the outlet of the diffuser.

18. An apparatus according to claim 17, wherein the plurality of transport members is regularly spaced along the length of the longitudinal transport zones and/or driving members.

19. An apparatus according to claim 17, wherein each transport member has a leading edge defining an upright face directed towards the outlet to push the product towards the outlet when the respective transport zone moves towards the outlet end of the diffuser.

20. An apparatus according to claim 19, wherein each transport member has a trailing edge defining an inclined surface directed towards the inlet end of the diffuser to allow the transport member to slide relative to the product when the respective transport zone moves towards the inlet end of the diffuser.

21. An apparatus according to claim 10, wherein each longitudinal transport zone comprises a longitudinal section of moving perforated screen deck.

22. An apparatus according to claim 21, wherein the perforated screen deck defines the longitudinal transport zones.

23. An apparatus according to claim 21, wherein the sections of moving perforated screen deck are supported on longitudinal skid rails.

24. An apparatus according to claim 23, wherein the transversely extending transport members may be mounted on an upper surface of the sections of moving perforated screen deck.

25. An apparatus according to claim 21, wherein the sections of moving perforated screen deck are supported on rotating rollers.

26. An apparatus according to claim 21, wherein the sections of moving perforated screen deck are supported on articulated supporting columns.

27. An apparatus according to claim 23, wherein each longitudinal transport zone comprises at least one longitudinal driving member.

28. An apparatus according to claim 27, wherein each longitudinal transport zone comprises a fixed screen deck with the transport members attached above the fixed screen deck to the at least one longitudinal driving member.

29. An apparatus according to claim 27, wherein each longitudinal driving member is an elongate bar.

30. An apparatus according to claim 27, wherein opposed ends of each transport member are attached to adjacent longitudinal driving members, thereby forming a ladder structure.

31. An apparatus according to claim 27, wherein each transport member is attached centrally to a longitudinal driving member, thereby forming a tree structure.

32. An apparatus according to claim 31, wherein each transport member is hinged to the longitudinal driving member, so that when the respective longitudinal transport zone moves towards the outlet of the diffuser each transport member extends transversely away from the longitudinal driving member, but folds inwardly against the longitudinal driving member when the respective longitudinal transport zone retracts towards the inlet of the diffuser.

* * * * *